Figure 1:
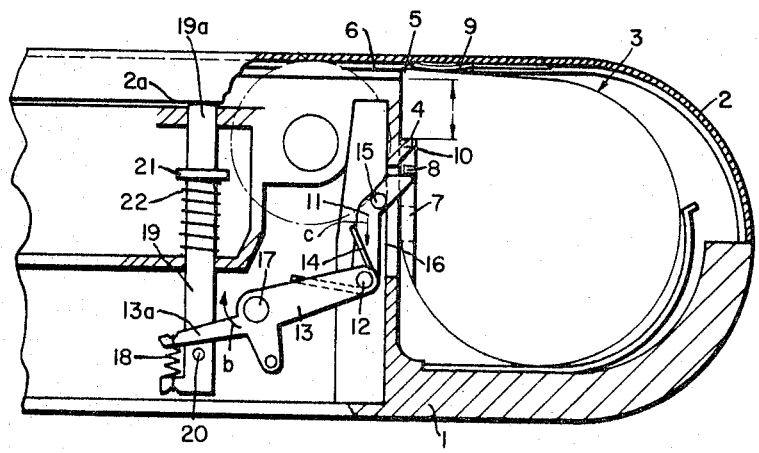

INVENTOR.
RUDOLF KREMP
ALFRED WINKLER

2

United States Patent Office 3,266,398
Patented August 16, 1966

3,266,398
CAMERA STRUCTURE FOR MAKING ADJUSTMENTS FOR FILM SPEED
Rudolf Kremp, Grunwald, Munich, and Alfred Winkler, Munich, Germany, assignors to Agfa Aktiengesellschaft, Leverkusen, Germany
Filed June 15, 1964, Ser. No. 375,156
Claims priority, application Germany, Sept. 30, 1963, A 44,170
11 Claims. (Cl. 95—31)

The present invention relates to cameras.

More particularly, the present invention relates to cameras which have structure for making adjustments for film speed.

The present invention deals particularly with a structure which is adapted to cooperate with a film speed indicating element which is carried by a film cartridge for the purpose of automatically making an adjustment for film speed when the cartridge is placed in the camera.

With structures of this type there is a possibility that the film speed indicating structure of the cartridge will not properly cooperate with the adjusting structure, which adjusts the camera for film speed, if great care is not exercised in introducing the cartridge into the camera. For example if the cartridge does not have a proper attitude when displaced into the interior of the camera housing the film speed indicating structure carried by the cartridge may have an improper position with respect to the camera structure which adjusts for film speed, so that an improper adjustment is made. It may even happen that sometimes the film speed indicating structure of the cartridge is not engaged by the structure which makes the adjustments for film speed, and the operator may have to exercise considerable care to make sure that these components cooperate properly with each other.

It is accordingly a primary objective of the present invention to provide a construction of the above type which reliably guarantees that there will be proper cooperation between the film speed indicating structure of a cartridge and the camera structure which makes adjustments for film speed without requiring the operator to be particularly careful as to how the cartridge is introduced into the camera housing.

In particular, it is an object of the present invention to provide a structure which will reliably maintain the camera components which make adjustments for film speed in an inoperative retraced position until after the film cartridge has been properly positioned in the cartridge chamber of the camera housing.

It is furthermore an object of the present invention to provide a structure which will sense the film speed indicating structure by engaging the latter but which at the same time will not in any way interfere with the introduction of the cartridge into the cartridge chamber so that with the structure of the invention there is no inconvenience with respect to the insertion of the cartridge into or the removal of a cartridge from the cartridge chamber of the camera.

It is furthermore an object of the present invention to provide a camera with a structure which on the one hand will make an adjustment for film speed and which on the other hand will automatically remain in an inoperative, retracted position until after the camera is closed, so that the film speed indicating structure which is carried by a film cartridge will not be engaged during setting of the film speed until after the camera has been closed.

In addition it is an object of the present invention to provide a camera with a structure which will make adjustments for film speed and which will operate in a fully automatic manner requiring absolutely no attention on the part of the operator so that the structure of the invention operates very reliable without requiring the operator to perform any operations in addition to the usual ones of opening the camera to remove a cartridge and to replace it with a new cartridge, the adjustments for film speed taking place in a fully automatic manner in response to the simple opening and closing of the camera and the placing of a cartridge into the same.

In particular, it is an object of the present invention to provide an exceedingly simple compact assembly composed of a relatively small number of parts which will operate very reliably to achieve the results set forth above.

With the above objects in view, the invention includes, in a camera, a camera housing which is formed in its interior with a chamber for receiving a film cartridge which carries a film speed indicating structure, and a feeler means which is carried by the camera housing for movement from a retracted, non-feeling position to a feeling position engaging the film speed indicating structure of the cartridge. In accordance with the present invention a means is operatively connected to the feeler means for maintaining the latter automatically in its retracted position until after a cartridge has been placed in the cartridge chamber of the camera housing.

Figure 2:
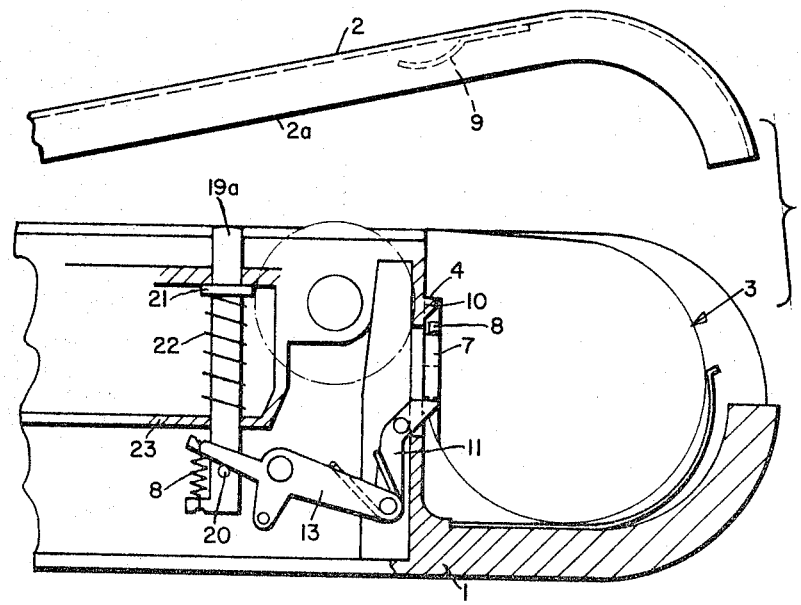

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary sectional plan view of one possible embodiment of a structure according to the present invention, the structure being shown in FIG. 1 with the camera housing closed and the structure which makes the adjustment of film speed in a feeling position engaging the film speed indicating structure of a cartridge which is in the camera; and FIG. 2 shows the structure of FIG. 1 after the camera has been opened.

Referring now to the drawings, there is illustrated therein a camera housing 1 which includes a means which is operable in connection with opening and closing of the camera housing. In the illustrated example the means which is operable in connection with the opening and closing of the housing takes the form of a cover 2 which may be hinged at one end to a side of the camera housing 1 and which is displaceable with respect to the camera housing between the open position shown in FIG. 2, where the cover 2 is spaced from the remainder of the camera housing 1, except for a hinged connection which is not illustrated in FIG. 2, and the closed position shown in FIG. 1 where the cover 2 engages the remainder of the camera housing so as to close the latter.

In its interior the camera housing 1 is formed with a cartridge chamber for receiving the film cartridge 3 which may, for example, be the type of cartridge in which the film is coiled without being supported on a rotary spool so that the film is simply withdrawn from the coils within the cartridge without requiring any structure to be connected to a rotary spool and of course without requiring the film to be attached at one end to such a spool. The cartridge 3 has an elongated shoulder 4 which extends parallel to the mouth 5 of the cartridge from which the film 6 issues to move from the mouth 5 to the focal plane of the camera in order to be exposed at the focal plane in a manner well known in the art. The shoulder 4 of the cartridge 3 is situated at one end of an exterior depression 7 formed in the cartridge 3, and within the depression 7 the cartridge 3 carries a film speed indicating structure in the form of a pin 8, in the illustrated example. According to the speed of the film which is within the cartridge 3 the film speed indicating structure 8 is situated at a given distance from the shoulder 4. Thus, for different film speeds the pin 8 will be situated at different distances from the shoulder 4.

In the position of the parts which are shown in FIG. 1 the shoulder 4 of the cartridge 3 is held against an elongated projection 10 carried by a wall of the camera housing in the interior thereof, by means of a leaf spring 9 which is fixed to the interior surface of the cover 2, so that when the cover 2 is displaced from the open position of FIG. 2 into the closed position of FIG. 1 the leaf spring 9 will engage and urge the cartridge 3 in a direction which presses the shoulder 4 thereof against the locating projection 10 in the interior of the housing 1. In this way the position of the film cartridge within the cartridge chamber will be precisely determined.

In order to sense the film speed indicating structure 8 so as to make an adjustment for film speed, a feeler means is carried by the housing 1 for movement from a retracted position to a feeling position where the feeler means engages the film speed indicating structure 8. This feeler means, in the illustrated example includes a supporting lever 13 which is supported for turning movement about an axis perpendicular to the optical axis, and FIG. 1 illustrates an elongated rod 17 supported for rotation in any suitable bearings and fixedly carrying the supporting lever 13 of the feeler means so that the supporting lever is free to turn about the axis of the elongated turnable shaft 17, and of course the shaft 17 will turn together with the lever 13. The feeler means includes in addition to the supporting lever 13 a feeler lever 11 pivotally connected to and carried by the supporting lever 13 by a pivot pin 12. A spring 14 is coiled in part about pin 12 and presses with its opposite ends against the feeler lever 11 and the supporting lever 13 to urge the feeler lever 11 to turn at all times in a clockwise direction relative to the supporting lever 13 as viewed in FIGS. 1 and 2. A wall of the housing 1 which defines part of the film cartridge chamber is formed with an elongated slot extending horizontally at the elevation of the pin 8, and the feeler lever 11 has a free end portion extending through this slot into the interior of the cartridge chamber. In addition, the feeler lever 11 carries a projection in the form of a pin 15 which presses against the left surface of this slotted wall, this surface 16 being indicated in FIG. 1, so that in this way by sliding against the surface 16 the pin 15 guides the free end portion of the feeler lever 11 for movement along a straight line toward and away from the film speed indicating structure 8. The feeler lever 11 is shown in FIG. 2 in a retracted, non-feeling position and in FIG. 1 in a feeling position where the free end of the lever 11 which extends through the slotted wall into the cartridge chamber engages the film speed indicating structure 8. Of course, the spring 14 maintains the pin 15 at all times in engagement with the surface 16.

The supporting lever 13 has on the side of the shaft 17 opposite from the feeler lever 11 an elongated portion 13a. A spring means urges the feeler means from the retracted position of FIG. 2 into the feeling position of FIG. 1, and in the illustrated example this spring means takes the form of a spring 18 one end of which is connected to the arm 13a of the supporting lever 13.

A retracting means is provided for retracting the feeler means 11, 13 from the feeling position of FIG. 1 into the retracted position of FIG. 2 when the camera is open, and in the illustrated example this retracting means takes the form of an elongated rod 19 supported for longitudinal movement by suitable bearings in the housing 1 and in the illustrated example the spring 18 is connected, at its end distant from the arm 13a of the lever 13, directly to the retracting rod 19, in the manner shown in FIGS. 1 and 2. It is to be noted that the housing 1 includes in its interior a surface which is parallel to and adapted to be engaged by an end of the cartridge 3, and the feeler means 11, 13 is supported for movement in a plane which is parallel to this surface which is adapted to be engaged by an end of the cartridge 3, so that with this construction an extremely simple arrangement is provided.

As was pointed out above, the retracting rod 19 is supported for longitudinal movement by the camera housing, and a motion transmitting means is connected between the feeler means and the retracting means 19 for transmitting movement of the retracting means 19 to the feeler means 11, 13 for retracting the latter to the retracted position shown in FIG. 2 when the retracting means 19 is displaced from the non-retracting position shown in FIG. 1 into the retracting position shown in FIG. 2. This motion transmitting means in the illustrated example takes the form of a pin 20 which is fixed to and projects from the rod 19, and it is to be noted that the rod 19 extends across the portion 13a of the supporting lever 13. Therefore, when the rod 19 is displaced from the non-retracting position shown in FIG. 1 into the retracting position shown in FIG. 2, the motion transmitting means which is formed by the pin 20 will engage the portion 13a of the lever 13 and turn the latter in clockwise direction, as viewed in FIG. 1, so as to retract the feeler means into the position shown in FIG. 2, which is the retracted position of the feeler means.

The rod 19 fixedly carries a collar 21 which engages a wall of the camera to limit the rearward, retracting movement of the rod 19, so that it cannot move rearwardly beyond the position shown in FIG. 2, and a spring means which is stronger than the spring means 18 is operatively connected to the retracting means 19 for urging the latter to its retracting position shown in FIG. 2. The spring means in the illustrated example takes the form of coil spring 22 coiled about the rod 19, engaging with one end the collar 21, and with its opposite end a wall 23 through which the rod 19 is guided for longitudinal movement, so that in this way the spring means 22 which is stronger than the spring means 18 will by its own force displace the structure to the retracted position illustrated in FIG. 2.

It is be be noted that the retracting rod 19 has a free end portion 19a which is located in the path of movement of the edge 2a of the cover 2 when the latter is displaced upon the open position of FIG. 2 into the closed position of FIG. 1, so that in this way the cover 2 will itself displace the rod 19 in opposition to the spring 22 from the retracting position of FIG. 2 into the non-retracting position of FIG. 1.

The shaft 17 is operatively connected in any suitable manner to the structure which makes the adjustment for film speed. For example, the structure which makes the adjustment for film speed may be formed by a rotary galvanometer housing which in its entirety is turned so as to make an adjustment for film speed in a manner well known in the art, and a portion of the shaft 17 may, for example, fixedly carry a gear sector meshing with a pinion which is coaxial fixed to the galvanometer housing so as to turn the latter to a position which automatically makes an adjustment for film speed according to the path through which the free end portion of the feeler lever 11 moves before engaging the pin 8. However, this structure for adjustment for film speed can take other forms well known in the art. For example, a structure may be provided to cover to an adjustable extent the window through which light reaches the photosensitive element of the light measuring structure, or the electrical circuit of the light measuring structure may carry a variable resistor which can be adjusted for the purpose of making an adjustment for film speed, and in either of these cases the turning of the rod 17 can have its rotary motion transmitted either to an adjustable window cover or to a variable resistor for automatically making an adjustment for film speed in a manner well known in the art.

Assuming that the parts are in the position of FIG. 1 and that the cover 2 is displaced from the closed position of FIG. 1 to the open position of FIG. 2, then the spring means 22 will displace the retracting rod 19 from the non-retracting position of FIG. 1 into the retracting position of FIG. 2, and as a result the motion transmitting pin 20 will turn the supporting lever 13 of the feeler means in a clockwise direction, thus retracting the feeler means 11, 13 to the retracted, non-feeling position of FIG. 1, and it will be noted that at this time the lever 13 turns in the direction of the arrow b while the feeler lever 11 moves in the direction of the arrow c. With the camera now open, the parts take the position illustrated in FIG. 2, and now the film cartridge 3 can be removed out of the cartridge chamber which is formed in the camera housing 1 and can be replaced by a new film cartridge. It will be noted that during these operations the feeler lever 11 remains in its retracted position shown in FIG. 2, and will only advance toward the film speed indicating structure 8 after the cover 2 has been returned to its closed position. It is furthermore to be noted that when the film cartridge 3 is introduced into the cartridge chamber the film speed indicating structure 8 is advanced in a direction, together with the remainder of the cartridge 3, which is directly opposite to the direction of movement of the feeler lever 11 from its retracted position to its feeling position engaging the pin 8. This feature according to which the feeler means when advancing from its retracted position advances in a direction opposite to that in which the cartridge is displaced when inserted into the cartridge chamber is a highly significant feature of the invention since it is guaranteed in this way that the feeler lever 11 remains forwardly of pin 8 during all of the operations performed in connection with the introduction of the film cartridge 3 into the camera, so that in this way there is no possibility of the pin 8 becoming located, for example, on the wrong side of the free end of the lever 11. For example, if it were possible for the free end of the lever 11 to be situated in the vicinity of the locating projection 10 while the cartridge 3 was introduced into the camera chamber, then by holding the cartridge 3 in a position other than the precisely proper one it would be possible for the pin 8 to be situated forwardly of the free end of the lever 11 and an improper adjustment of film speed would result. However, this danger is reliably avoided by arranging the structure so that when the camera is open the feeler means is automatically maintained in its retracted position shown in FIG. 2 and must move from its retracted position to its feeling position in a direction opposed to the direction of movement of the film cartridge into the chamber of the camera.

Finally, when the cover 2 is closed the edge 2a thereof will engage the free end 19a of the retracting rod 19 and will displace the latter in opposition to the spring 22 to the non-retracting position of FIG. 1. This movement will displace the motion transmitting pin 20 beyond the portion 13a of the lever 13 across which the rod 19 extends, and thus the spring means 18 is free to urge the feeler lever 11 against the pin 8. At this time the lever 13 turns in a direction opposite to that indicated by the arrow b. Of course, the portion 13a of the lever 13 remains in engagement with the pin 20 until the free end of the lever 11 engages the pin 8, whereupon the continued forward movement of the retracting rod 19 will tension the spring 18 to provide the parts with the position indicated in FIG. 1. Moreover, during the displacement of the feeler means from its retracted to its feeling position the spring 14 guarantees that the projection 15 will slide along the surface 16 so that the feeler means will be properly guided along a substantially straight path, at its free end portion, into engagement with the film speed indicating structure carried by the film cartridge. Thus, the extent to which the feeler lever 11 moves in the direction opposite to that indicated by the arrow c until it engages the pin 8 is an indication of the film speed.

Of course, the invention is not necessarily limited to the details described above and shown in the drawing. The retracting structure can be constructed differently, for exmple, and furthermore there is the possibility of actuating the retracting structure with a structure for releasably locking the camera cover rather than with the camera cover itself.

Also, it is to be noted that the structure of the invention will operate if the spring 18 is connected only to the lever 13 and not to the retracting rod 19. As long as the spring 18 urges the lever 13 in a counterclockwise direction, as viewed in FIG. 2, the structure will operate properly. However, the features of connecting the spring 18 to the arm 13a and to the retracting rod 19 is preferred because in this way the spring 18 can be made much shorter and need not exert such a great force as would be required if it were connected only to the lever 13. Because of the feature of connecting the spring 18 between the lever 13 and the retracting rod 19 advantage is taken of the displacement of the retracting rod 19 to the non-retracting position of FIG. 1 to provide bodily displacement of the spring 18 and through the latter swinging of the lever 13 in a counterclockwise direction, as viewed in FIG. 2, so that with this feature use is made of the movement of the retracting rod 19 for turning the lever 13 and reliance is not placed fully on a spring such as the spring 18 for this purpose, so that as a result the spring 18 can be made of a smaller force and of a smaller size.

It will be understood that each of the elements described above, or two or more together, may also find a useful application in other types of cameras differing from the types described above.

While the invention has been illustrated and described as embodied in cameras with structure for adjusting for film speed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera for use with film cartridges of the type which carry a film speed indicating structure, in combination, a camera housing defining in its interior a cartridge chamber for receiving a film cartridge which carries a film speed indicating structure; feeler means carried by said camera housing for movement between a retracted position and a feeling position engaging said film speed indicating structure after a film cartridge has been placed in said chamber; urging means mounted in said camera housing and engaging said feeler means permanently tending to move the latter from said feeling into said retracted position thereof; a member carried by said camera housing and being moved back and forth between two positions in a first and second direction respectively in connection with insertion of a film cartridge into said camera housing; and combined releasing and moving means actuated by said member so as to permit during movement of said member in said first direction movement of said feeler means under the action of said urging means from said feeling into said retracted position thereof and moving said feeler means against the action of said urging means from said retracted to said feeling position thereof during movement of said member in said second direction.

2. In a camera for use with film cartridges of the type which carry a film speed indicating structure, in combination, a camera housing defining in its interior a cartridge chamber for receiving a film cartridge which carries film speed indicating structure, said camera housing being capable of being opened and closed for receiving a cartridge in said chamber when said camera housing is opened, whereupon said camera housing can be closed with the cartridge in said chamber; retracting means carried by said housing for movement between a retracting position and a non-retracting position; biasing means mounted in said camera housing and engaging said retracting means for permanently tending to move the latter from said non-retracting to said retracting position thereof; feeler means carried by said housing for movement between a retracted position and a feeling position engaging said film speed indicating structure of the cartridge in said chamber; motion transmitting means connected between said retracting means and feeler means for retracting said feeler means to said retracted position thereof when said retracting means moves from said non-retracting to said retracting position thereof and for releasing said feeler means for movement to said feeling position thereof when said retracting means is displaced from said retracting to said non-retracting position thereof; and means carried by said camera housing and being moved in connection with opening and closing of said housing for actuating said retracting means to displace the latter from said retracting to said non-retracting position against the action of said biasing means when the housing is closed and to release said retracting means for movement from said non-retracting to said retracting position thereof under the action of said biasing means when the housing is opened, whereby said feeler means will automatically be retained in said retracted position thereof while the housing is open.

3. In a camera for use with film cartridges of the type which carry a film speed indicating structure, in combination, a camera housing defining in its interior a cartridge chamber adapted to receive a film cartridge carrying a film speed indicating structure when the film cartridge is displaced in a given direction into said chamber; a feeler means carried by said camera housing for movement in a direction opposite to said given direction from a retracted position to a feeling position engaging said film speed indicating structure; urging means mounted in said camera housing and engaging said feeler means permanently tending to move the latter from said feeling into said retracted position thereof; a member carried by said camera housing and being moved back and forth between two positions in a first and second direction respectively in connection with insertion of a film cartridge into said camera housing; and combined releasing and moving means actuated by said member so as to permit during movement of said member in said first direction movement of said feeler means under the action of said urging means from said feeling into said retracted position thereof and moving said feeler means against the action of said urging means from said retracted to said feeling position thereof during movement of said member in said second direction.

4. In a camera for use with film cartridges of the type which carry a film speed indicating structure, in combination, a camera housing defining in its interior a chamber for receiving a film cartridge which carries a film speed indicating structure and which is moved in a given direction when placed in said chamber; retracting means carried by said housing for movement between a retracting and a non-retracting position; biasing means mounted in said camera housing and engaging said retracting means for permanently tending to move the latter from said non-retracting to said retracting position thereof; feeler means carried by said housing for movement from a retracted position in a direction opposite to said given direction to a feeling position in engagement with said film speed indicating structure of the cartridge; motion transmitting means connected between said retracting means and feeler means for retracting the latter from said feeling to said retracted position when said retracting means moves from said non-retracting to said retracting position thereof and for releasing said feeler means for movement from said retracted to said feeling position thereof when said retracting means is displaced from said retracting to said non-retracting position thereof, said housing being capable of being opened and closed for receiving a cartridge in said chamber when said housing is opened, whereupon the housing is closed with the cartridge in said chamber; and means carried by said housing and being moved in connection with the opening and closing of said housing for displacing said retracting means from said retracting to said non-retracting position against the action of said biasing means when the housing is closed and for releasing said retracting means for movement from said non-retracting to said retracting position thereof under the action of said biasing means when the housing is opened, whereby said feeler means will be in said retracted position thereof when the housing is open.

5. In a camera for use with film cartridges of the type which carry a film speed indicating structure, in combination, a camera housing defining in its interior a chamber adapted to receive a film cartridge which carries a film speed indicating structure, said housing having in its interior a surface which defines part of said chamber, and which is parallel to and adapted to be engaged by an end of a cartridge in said chamber; feeler means carried by said housing for movement in a plane parallel to said surface from a retracted, non-feeling position to a feeling position where said feeler means engages said film speed indicating structure; urging means mounted in said camera housing and engaging said feeler means permanently tending to move the latter from said feeling into said retracted position thereof; a member carried by said camera housing and being moved back and forth between two positions in a first and second direction respectively in connection with insertion of a film cartridge into said camera housing; and combined releasing and moving means actuated by said member so as to permit during movement of said member in said first direction movement of said feeler means under the action of said urging means from said feeling into said retracted position thereof and moving said feeler means against the action of said urging means from said retracted to said feeling position thereof during movement of said member in said second direction.

6. In a camera for use with film cartridges of the type which carry a film speed indicating structure, in combination, a camera housing capable of being opened and closed and having an interior defining a chamber which is adapted to receive a film cartridge when said camera housing is open, said cartridge carrying a film speed indicating means; feeler means carried by said housing for movement between a retracted, non-feeling position and a feeling position engaging said film speed indicating structure; first spring means operatively connected to said feeler means for urging the latter from said retracted to said feeling position thereof; retracting means carried by said housing for movement between retracting and non-retracting positions; motion transmitting means connected between said retracting means and said feeler means for retracting said feeler means in opposition to said first spring means from said feeling to said retracted position thereof when said retracting means moves from said non-retracting to said retracting position thereof and releasing said feeler means to said first spring means to be moved thereby from said retracted to said feeling position when said retracting means is displaced from said retracting to said non-retracting position thereof; second spring means operatively connected to said retracting means for urging the latter from said non-retracting to said retracting position thereof, said second spring means being stronger than said first spring means to cause said feeler means to be retracted from said feeling to said retracted position thereof in opposition to said first spring means when said second spring means displaces said retracting means from said non-retracting to said retracting position thereof; a member carried by said camera housing and being moved in connection with the closing and opening of said housing back and forth between two positions in a first and second direction respectively; combined releasing and moving means actuated by said member so as to move said retracting means in opposition to said second spring means from said retracting to said non-retracting position thereof during movement of said member in said second direction releasing said retracting means to the force of said second spring means during movement of said member in said first direction and, whereby said feeler means is automatically maintained in said retracted position thereof while said housing is open.

7. In a camera for use with film cartridges of the type which carry a film speed indicating structure, in combination, a camera housing capable of being opened and closed and defining in its interior a chamber for receiving a film cartridge which carries a film speed indicating structure; feeler means carried by said housing for movement between a retracted, non-feeling position and a feeling position engaging said film speed indicating structure; first spring means operatively connected to said feeler means for urging the latter from said retracted to said feeling position; an elongated retracting rod carried by said camera housing for longitudinal movement between a retracting position and a non-retracting position; motion transmitting means connected between said feeler means and said rod for displacing said feeler means in opposition to said first spring means from said feeling to said retracted position during movement of said rod from said non-retracting to said retracting position thereof; second spring means stronger than said first spring means engaging said rod for urging the latter from said non-retracting to said retracting position thereof; a member carried by said camera housing and being moved in connection with the closing and opening of said housing back and forth between two positions in a first and second direction, respectively; said rod in opposition to said second spring means from said retracting to said non-retracting position during movement of said member in said first direction and releasing said rod to said second spring means to be displaced thereby from said non-retracting to said retracting position during movement of said member in said second direction, whereby said feeler means will be maintained in said retracted position whenever the housing is open and will be released to said first spring means to be displaced thereby to said feeling position only when the housing is closed.

8. In a camera for use with film cartridges of the type which carry a film speed indicating structure, in combination, a camera housing having a cover displaceable with respect to the remainder of the camera housing between an open position spaced from the remainder of said housing to open the latter and a closed position engaging the remainder of the housing to close the latter, said housing defining in its interior a chamber for receiving a film cartridge when said cover is displaced to said open position thereof, said cartridge carrying a film speed indicating structure; feeler means carried by said housing for movement between a retracted, non-feeling position and a feeling position engaging said film speed indicating structure; first spring means operatively connected to said feeler means for displacing the latter from said retracted to said feeling position thereof; an elongated retracting rod supported for longitudinal movement by said housing and having a free end portion located in the path of movement of said cover from said open to said closed position thereof, said rod being displaced by said cover, when the latter is moved from said open to said closed position, from a retracting to a non-retracting position, respectively, and said rod being free to move from said non-retracting to said retracting position thereof when said cover is displaced from said closed to said open position; second spring means stronger than said first spring means and operatively connected to said rod for displacing the latter from said non-retracting to said retracting position thereof; and motion transmitting means connected between said feeler means and rod for transmitting movement of said rod to said feeler means to displace the latter in opposition to said first spring means from said feeling to said retracted position during movement of said rod by said second spring means from said non-retracting to said retracting position when said cover is displaced from said closed to said open position, whereby said feeler means will be displaced from said retracted to said feeling position thereof only when said cover is displaced from said open to said closed position.

9. In a camera for use with film cartridges of the type which carry a film speed indicating structure, in combination, a camera housing capable of being opened and closed and defining in its interior a chamber for receiving a film cartridge which has a film speed indicating structure; a support lever turnably carried by said camera housing; a feeler lever turnably carried by said support lever; first spring means operatively connected to said supporting lever for urging the latter in a direction which displaces said feeler lever from a retracted position to a feeling position in engagement with said film speed indicating structure of a cartridge in said chamber; an elongated retracting rod supported for longitudinal movement by said housing and extending across a portion of said supporting lever, said rod being movable between a non-retracting and a retracting position; a motion transmitting pin carried by said rod and engaging said portion of said supporting lever across which said rod extends during movement of said rod from said non-retracting to said retracting position to turn said supporting lever in opposition to said first spring means in a direction which retracts said feeler lever from said feeling to said retracted position thereof; second spring means stronger than said first spring means and engaging said rod for urging the latter to said retracting position thereof from said non-retracting position; and means operable in connection with the opening and closing of said housing for displacing said rod in opposition to said second spring means when the housing is closed from said retracting to said non-retracting position and releasing said rod to said second spring means when the housing is opened, whereby said feeler lever will be maintained in said retracted position whenever the housing is open.

10. In a camera for use with film cartridges of the type which carry a film speed indicating structure, in combination, a camera housing defining in its interior a chamber for receiving a film cartridge which carries a film speed indicating structure; feeler means carried by said camera housing and having a feeler portion movable from a retracted, non-feeling position to a feeling position engaging said film speed indicating structure; guide means carried by said housing and guiding said feeler portion for movement in a substantially straight path between said retracted and feeling positions; biasing means mounted in said camera housing and engaging said feeler means permanently tending to more said feeler portion thereof from said feeling into said retracted position; a member carried by said camera housing and being moved back and forth between two positions in a first and second direction respectively in connection with insertion of a film cartridge into said camera housing; and combined releasing and moving means actuated by said member so as to permit during movement of said member in said first direction movement of said feeler portion under the action of said biasing means from said feeling into said retracted position thereof and moving said feeler portion against the action of said biasing means from said retracted to said feeling position thereof during movement of said member in said second direction.

11. In a camera for use with film cartridges of the type which carry a film speed indicating structure, in combination, a camera housing having a cover displaceable with respect to the remainder of said camera housing between an open position spaced from the remainder of the camera housing and a closed position engaging the remainder of the camera housing and closing said housing, said housing being open when said cover is in said open position thereof and said housing defining in its interior a chamber for receiving a film cartridge which carries a film speed indicating structure, said cartridge being insertable into and removable from said chamber when said cover is in said open position thereof, said housing having a wall which defines part of said chamber and which is provided with an elongated slot, the cartridge being displaced in a given direction when introduced into said chamber when said cover is in said open position thereof and having its film speed indicating structure located adjacent said slot of said wall when said cartridge is in position in said chamber; a supporting lever supported for rotary movement by said housing; a feeler lever turnably carried by said supporting lever for free movement relative thereto and having a free end portion extending through said slot into said chamber, said feeler lever being displaceable in the direction opposite to said given direction from a retracted, non-feeling position to a feeling position where said free end portion of said feeler lever engages said film speed indicating structure; a projection carried by said feeler lever and engaging a surface of said wall which adjoins said slot thereof; a spring engaging said feeler lever and maintaining said projection thereof in engagement with said wall so that said wall together with said projection guide said free end portion of said feeler lever for movement along said slot extending at all times through said slot into said chamber; an elongated retracting rod supported for longitudinal movement by said housing between a retracting and a non-retracting position, said rod extending across a portion of said supporting lever; a second spring extending between and connected to said supporting lever, at said portion thereof, and said rod for urging said supporting lever to turn in a direction which displaces said feeler lever to said feeling position thereof when said rod is displaced in said housing from said retracting to said non-retracting position thereof; a motion transmitting pin carried by said rod and engaging said portion of said supporting lever to turn said supporting lever in opposition to said second spring in a direction which displaces said feeler lever from said feeling to said retracted position when said rod is displaced from said non-retracting to said retracting position, said rod having a free end portion located in the path of movement of said cover when the latter is displaced from said open to said closed position, said cover engaging said free end portion of said rod and displacing the latter from said retracting to said non-retracting position to removement of said cover from said open to said closed position thereof; and a third spring stronger than said second spring and urging said rod to said retracting position thereof, said cover displacing said rod in opposition to said third spring to said non-retracting position when said cover is displaced from said open to said closed position, and said cover releasing said rod to said third spring when said cover is displaced from said closed to said open position, whereby said feeler lever is maintained in said retracted position thereof except when said cover is in its closed position.

References Cited by the Examiner
UNITED STATES PATENTS

| | | | |
|---|---|---|---|
| 2,043,901 | 6/1936 | Mihalyi | 95—10 X |
| 2,080,055 | 5/1937 | Martin | 95—10 X |
| 2,186,611 | 1/1940 | Martin | 95—10 X |
| 2,186,613 | 1/1940 | Mihalyi. | |
| 2,493,928 | 1/1950 | Rath | 95—10 |
| 3,025,777 | 3/1962 | Wilkenson | 95—31 X |

FOREIGN PATENTS

| | | |
|---|---|---|
| 456,782 | 7/1944 | Belgium. |
| 456,783 | 7/1944 | Belgium. |

NORTON ANSHER, *Primary Examiner.*

EVON C. BLUNK, *Examiner.*